United States Patent [19]
Drobnik

[11] Patent Number: 5,374,887
[45] Date of Patent: Dec. 20, 1994

[54] INRUSH CURRENT LIMITING CIRCUIT

[75] Inventor: Josef C. Drobnik, Carp, Canada

[73] Assignee: Northern Telecom Limited, Montreal, Canada

[21] Appl. No.: 150,911

[22] Filed: Nov. 12, 1993

[51] Int. Cl.$^5$ .............. G05F 5/00; H02H 9/00
[52] U.S. Cl. .................. 323/299; 323/908; 361/58
[58] Field of Search ............ 323/299, 908; 361/58

[56] References Cited

U.S. PATENT DOCUMENTS

| | | |
|---|---|---|
| 4,631,470 | 12/1986 | Bingley . |
| 5,010,293 | 4/1991 | Ellersick . |
| 5,079,455 | 1/1992 | McCafferty et al. . |
| 5,087,871 | 2/1992 | Losel . |
| 5,122,724 | 6/1992 | Criss ........................... 323/908 X |
| 5,187,653 | 2/1993 | Lorenz ......................... 323/908 X |
| 5,283,707 | 2/1994 | Conners et al. .............. 323/908 X |

FOREIGN PATENT DOCUMENTS 2140996 12/1984 United Kingdom .

*Primary Examiner*—R. Skudy
*Assistant Examiner*—E. To
*Attorney, Agent, or Firm*—Yoshiharu Toyooka

[57] ABSTRACT

An inrush current limiting circuit contains an FET as an active component which is controlled by a network of passive components. The network includes a gate control circuit for controlling the operation of the FET and a negative feedback circuit which responds to the load voltage during the transient state. The current limiting circuit is fast acting during momentary power interruptions and has low power losses.

4 Claims, 2 Drawing Sheets

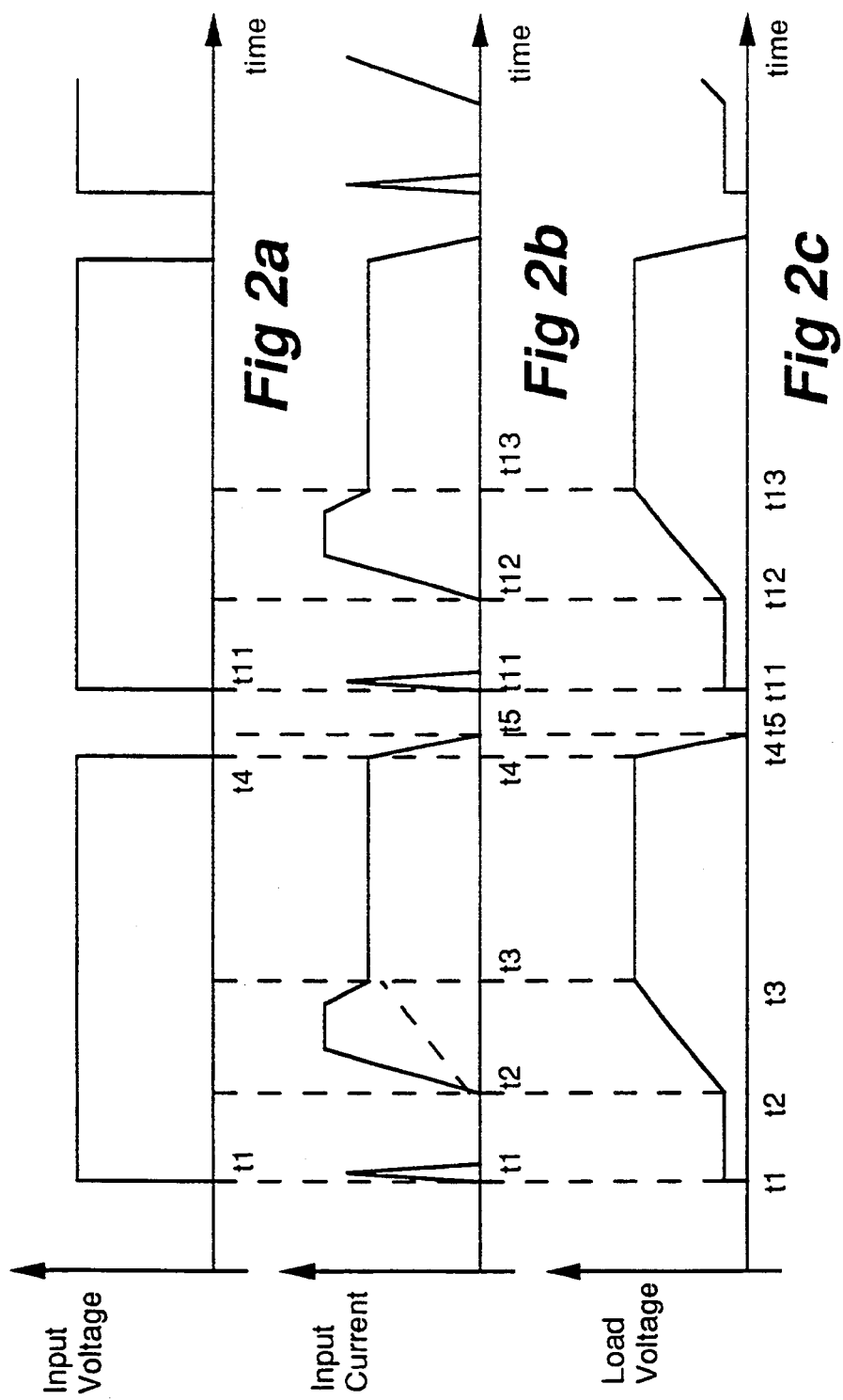

INRUSH CURRENT LIMITING CIRCUIT

FIELD OF THE INVENTION

The present invention relates generally to a surge current limiting circuit. In particular, it is directed to a inrush current limiting circuit which contains a semiconductor switch and a negative feedback circuit.

BACKGROUND OF THE INVENTION

Many electronic circuits and systems include the need for protection against inrush current, a short duration current surge due to a highly capacitive initial power load. Inrush current is particularly a problem within telecommunications systems which typically provide distributed 48 volts battery to all of the circuits throughout the network.

Telecommunications circuits are usually formed as small plug-in circuit boards carrying and interconnecting solid state and passive circuit elements. Such circuit elements typically require voltages lower than the nominal 48 volt common battery, and so DC to DC power conversion modules are typically included on each such plug-in board to provide suitable lower operating DC voltages, such as 5 volts and 12 volts. One characteristic of the DC to DC power conversion modules is that it presents a highly capacitive initial power load to the supply bus, with resultant enormous instantaneous current flow when power is first applied.

When such a circuit board is plugged in to a voltage source the inrush current is extremely high. In order to protect connectors, fuses and the circuit components from damage, the inrush current must be limited to an acceptable level. Furthermore, particularly within telecommunications systems where the availability of continuous service for the service subscriber is mandatory, modules are plugged into and out of the system without shutting down the 48 volt common battery. Intermittent contact of power pins on insertion and removal of circuit boards requires that any inrush current limiting circuit respond very quickly.

In U.S. Pat. No. 5,010,293, issued on Apr. 23, 1991 to Ellersick, an inrush current limiting circuit is described. The circuit of Ellersick uses an FET in series with a conduction path from the power source to load. The voltage across a current sensing resistor which is also in the conduction path is monitored by a bipolar transistor. The transistor generates an output in proportion to the current through the sensing resistor and controls the operation of the FET to limit the inrush current. In U.S. Pat. Nos. 5,087,871, issued on Feb. 11, 1992 to Losel, and 4,631,470, issued on Dec. 23, 1986 to Bingley, inrush current limiting circuits include a surge limiting resistor in parallel with an FET. During the power up, the surge limiting resistor limits the inrush current and in the steady state operation the FET is conducting to shunt the surge limiting resistor. A time delay circuit is made up of resistors and capacitors and has a large time constant. The time delay circuit controls the potential of the FET gate so that the FET turns on more slowly than the inrush current. The current limiting in Losel and Bingley is a passive action by a surge current limiting resistor, that is to say, the action is linear and not dynamic, so that the current is limited in proportion to the voltage instead of in proportion to the rate of change in voltage. Their circuits also contain a large time constant which may be longer than the momentary power interruption. The circuits are not fast acting and thus will not limit the current when the power is disrupted for a very short period of time. The circuit of Ellersick, on the other hand, appears quick acting due to the lack of capacitive components. However, it contains a current sensing resistor in series with a conduction path. The resistor is always in the conduction path and dissipates a rather large amount of power all the time.

OBJECTS OF THE INVENTION

It is therefore an object of the present invention to provide an inrush current limiting circuit which is fast acting and dynamic, and yet has very low power losses.

It is another object of the present invention to provide an inrush current limiting circuit which includes a negative feedback feature.

It is a further object of the present invention to provide an inrush current limiting circuit which requires relatively few components.

SUMMARY OF THE INVENTION

Briefly stated, the present invention is directed to an inrush current limiting circuit for limiting transient inrush current from input terminals to which a DC input power source is to be connected, to load terminals to which a capacitive load is to be connected. According to one aspect, the current limiting circuit comprises a pair of connection paths between the input terminals and load terminals, and FET means connected in series with one of the connection paths. The other of the connection paths is a direct connection. The current limiting circuit further includes a gate control circuit for applying a control potential to the gate of the FET means in response to an input voltage at the input terminals, and a negative feedback circuit, connected between one of the load terminals and the gate control circuit, for producing a feedback signal in response to a load voltage at the load terminals and feeding back the same to the gate of the FET means to control the conduction of the FET means in response to the load voltage. Furthermore, the negative feedback circuit comprises a diode, resistors and capacitors having a predetermined time constant.

BRIEF DESCRIPTION OF DRAWINGS

For a more complete understanding of the present invention and for further objects and advantages thereof, reference may now be made to the following description, taken in conjunction with the accompanying drawings, in which:

FIGS. 2a, 2b, and 2c are graphs showing the timing relationship of the input voltage, input current and load voltage respectively.

DETAILED DESCRIPTION OF THE PREFERRED EMBODIMENTS OF THE INVENTION

Figure 1:
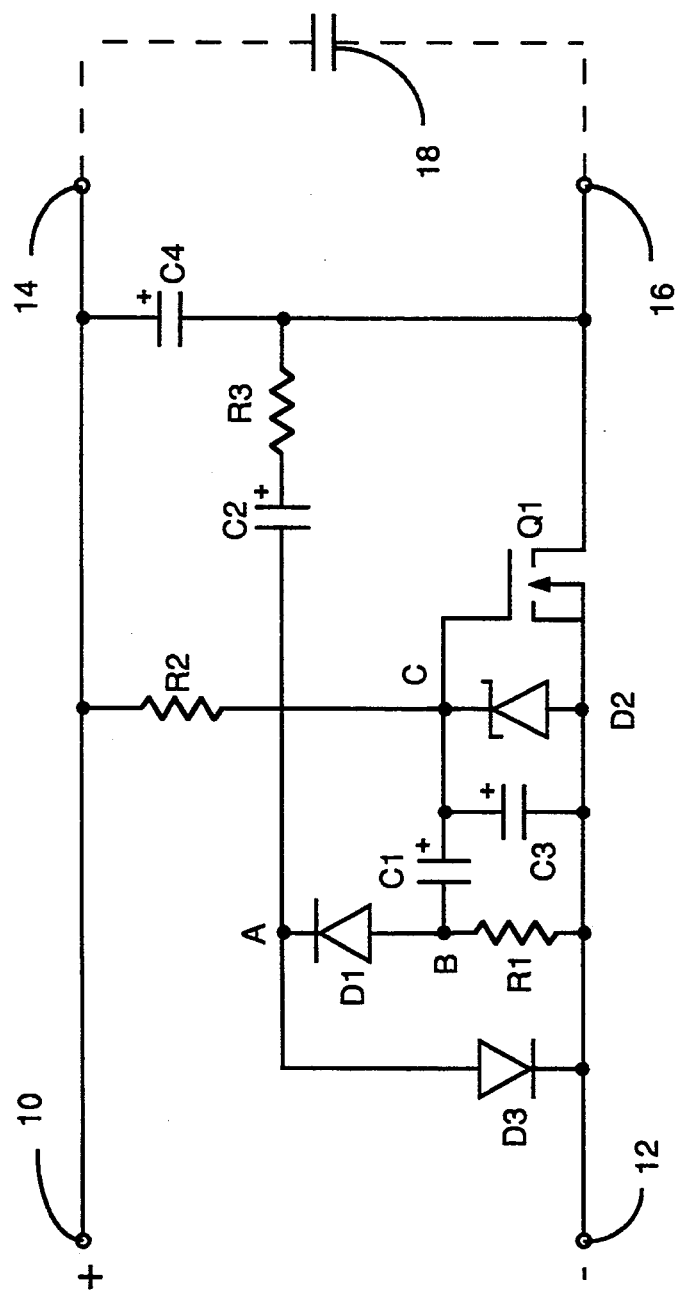
FIG. 1 is a schematic circuit diagram according to one embodiment of the invention.

FIG. 1 illustrates the inrush current limiting circuit according to a preferred embodiment of the invention. The circuit includes input terminals 10 and 12 to which an input power source (not shown) supplying a DC input voltage of e.g. 48 volts is connected. Terminals 14 and 16 are load terminals which supply the power to a load. The polarity of the terminals is as shown. In telecommunications systems, the input power source is usually a battery or AC rectifying power supply, and the load is a DC to DC converter module which often contains large capacitors. In FIG. 1, the load is shown as capacitor 18 connected by dotted lines across the load terminals. Input terminals 10 and 12 are connected by a pair of connection paths to load terminals 14 and 16. An FET Q1 is in one of the paths to control current flow from the input to the load. A gate control circuit produces a control signal which is applied to the gate G of the FET. The gate control circuit is made up of a resistor R2, a zener diode D2 and a capacitor C3. A negative feedback circuit includes capacitors C1, C2 and C4 and resistors R1 and R3. It further contains diodes D1 and D3. The negative feedback circuit adjusts the control signal applied to the gate through capacitor C1.

FIG. 2a and 2b illustrate in graph form changes in the voltage and current in relation to time. By referring to FIG. 2a and 2b, the operation of the inrush current limiting circuit of FIG. 1 is described. Under steady operating conditions, the voltage at node C keeps the FET in saturation (in full conduction), thus electrically connecting the input and load terminals. During transient conditions, the FET works in linear mode which will be described below. On initial power up at t1, FET Q1 is off and none of the capacitors is charged, i.e. voltage across all the capacitors is equal to zero. The input voltage step is applied to input terminals 10 and 12 but the voltage between load terminals 14 and 16 is zero. Thus the full input voltage appears between the drain D and source S of FET Q1, and therefore between terminals 12 and 16. The same voltage minus the forward voltage drop across diode D3 should exist between node A and terminal 16 across a series connection of capacitor C2 and resistor R3. Thus capacitor C2 is being charged at the rate of the time constant R3C2. At the same time, capacitors C1 and C3 are being charged through resistor R2. The current through capacitor C1 is further limited by resistor R1. The time constant for charging capacitor C3 is R2C3 and for capacitor C1 it is (R2+R1)C1. The voltage between the gate and source of the FET is clamped by zener diode D2 so as not to exceed a certain value and thereby damage the FET during steady state operation. On power up, the gate voltage at node C therefore increases linearly at a rate of the time constant determined by resistors R1, R2 and capacitors C1 and C3 until the threshold of the FET is reached. As soon as the voltage at the gate reaches the threshold at t2, the FET starts to conduct. Thus terminal 16 turns more negative with respect to terminal 14. Capacitor C2 resistor R3 and diode D1 of the negative feedback circuit force the voltage of the gate in the opposite direction to that of resistor R2. This effect results in current limiting between t2 and t3. In other words, the voltage change dV/dt across load terminals, and thus the current through the FET, is limited by the circuit consisting of diode D1, capacitor C2 and resistor R3. FIG. 2a therefore shows a slight rise in the input current, which is the result of the negative feedback.

Should the voltage on the input terminals be disconnected momentarily between t4 and t11, (this frequently happens when a power pack is being plugged into the shelf), capacitors C3 and C1 are discharged almost instantly through the negative feedback components D1, C2 and R3 as well as through resistor R1. The inrush current limiter is thus ready for another step voltage in its input. Diode D3 ensures that node A will not go below the potential of negative input terminal 12 and that the potential of node B will not rise higher than the combined forward drops of diodes D1 and D3 above negative input terminal 12. Allowing the voltage of node A to drop below that of the negative input terminal would increase the discharge time constant as well as the restart constant. Diode D3 thus separates the time constant for charging up and discharging of the total capacitance. A fast discharge of the capacitance is required for momentary power disruptions.

FIG. 2b shows current peaks at t1 and t11. These peaks are caused by capacitor C2 and the internal drain to source capacitance of the FET. The duration of these peaks, as well as the amplitude is negligible.

As described above, the inrush current limiting circuit of the present invention requires no current sensing resistor in series with the connecting path. This eliminates an extra power loss by the resistor, which in the case of above-referenced U.S. Pat. No. 5,010,293 would amount to about 15W ($=20A^2*0.039\Omega$). In addition to a low power loss, the present invention limits the inrush current even in the event of momentary power interruptions.

Particulars and representative values of the components m one embodiment are as follows:

| FET Q1: | IFF150 | Diodes D1, D3: | 1N914 | D2: | 1N5237 |
|---|---|---|---|---|---|
| Resistors R1: | 3.92 K$\Omega$ | R2: | 50 K$\Omega$ | R3: | 1 K$\Omega$ |
| Capacitors C1, C2: | 4.7 $\mu$F | C3: | 0.47 $\mu$F | C4: | 0.22 $\mu$F |

What is claimed is:

1. An inrush current limiting circuit for limiting transient inrush current from input terminals to which a DC input power source is to be connected, to load terminals to which a capacitive load is to be connected, comprising:
   a pair of connection paths between the input terminals and load terminals;
   FET means connected in series with one of the connection paths;
   a direct connection in the other of the connection paths;
   a gate control circuit for applying a control potential to the gate of the FET means in response to an input voltage at the input terminals; and
   a negative feedback circuit connected between one of the load terminals and the gate control circuit for producing a feedback signal in response to a load voltage at the load terminals and feeding back the same to the gate of the FET means to control the conduction of the FET means in response to the load voltage,
   in that the negative feedback comprises a diode, resistors and capacitors having a predetermined time constant.

2. The inrush current limiting circuit according to claim 1, wherein the diode is connected between one of the input terminals and the negative feedback circuit.

3. The inrush current limiting circuit according to claim 1, wherein the gate control circuit is connected across the input terminals and comprises a resistor and a capacitor having a predetermined time constant.

4. The inrush current limiting circuit according to claim 3, wherein a zener diode is connected across the FET.

* * * * *